United States Patent [19]

Edlund et al.

[11] 3,731,816

[45] May 8, 1973

[54] SUBSTITUTED CELLULOSE IN GRAIN FORM AND A METHOD OF PRODUCING THE SAME

[75] Inventors: Ove Harald Edlund, Uppsala, Sweden; Bjorn Arild Andreassen, Hovik, Norway

[73] Assignee: Pharmacia Fine Chemicals AB, Uppsala, Sweden

[22] Filed: Aug. 6, 1971

[21] Appl. No.: 169,866

[30] Foreign Application Priority Data

Aug. 6, 1970 Sweden ............................. 10834/70

[52] U.S. Cl. ................................................ 210/500
[51] Int. Cl. .............................................. B01d 39/00
[58] Field of Search .................... 55/387, 74; 210/31, 210/198, 500, 502

[56] References Cited

UNITED STATES PATENTS

| 2,543,928 | 3/1951 | O'Neill, Jr. et al. | 264/13 |
| 2,773,027 | 12/1956 | Powers | 210/500 |
| 3,441,142 | 4/1969 | Oja | 210/500 X |
| 3,476,737 | 11/1969 | Emneus et al. | 210/31 C |
| 3,597,350 | 8/1971 | Determann et al. | 210/500 X |
| 3,598,245 | 8/1971 | Determann et al. | 210/500 |

Primary Examiner—Samih N. Zaharna
Assistant Examiner—R. W. Burks
Attorney—Fred C. Philpitt

[57] ABSTRACT

A substituted cellulose to be used as a separation medium in gel filtering processes in the form of substantially spherical grains containing 2 – 25 g of substituted cellulose per decilitre and having a pore size of generally between 2 to 2,000 $\mu$m, the cellulose containing as substituent ether bound uncharged groups, the substitution degree corresponding to a solubility of the substitution product in an 8 percent solution of sodium hydroxide in water (w/w) of at least about 1 percent (w/w) and to insolubility in water within the pH range of 11 – 1.

10 Claims, No Drawings

SUBSTITUTED CELLULOSE IN GRAIN FORM AND A METHOD OF PRODUCING THE SAME

A similar product is known to the art (see the U.S. Pat. application Ser. No. 775,185, now U.S. Pat. No. 3,597,350). In this instance the grains comprise non-substituted cellulose. Owing to the selection of substituted cellulose, the advantages afforded by the product according to the present invention are superior to those of the known product. Thus, the mechanical properties and swelling properties in water and in other liquid of the new product are much superior to similar properties in the known product. The new product can be used in gel filtering processes, not only in water or aqueous solutions, but also in other solvents, such as ethyl alcohol and chloroform, and this is particularly true when the substituted cellulose contains as the substituent hydroxy alkyl groups, especially 2-hydroxy propyl groups. The cellulose products of the present invention complement in an advantageous manner previously available products for gel filtering purposes, owing to the fact that their macroporous properties render them suitable for use in the separation of mixtures containing macro-molecules.

In accordance with one advantageous embodiment of the invention, the substituted cellulose is characterized in that the uncharged group is a lower alkyl group or a lower hydroxy alkyl group containing at most four carbon atoms.

In accordance with another embodiment of the invention, which is particularly advantageous since it enables products to be produced which have a wide swelling spectrum in solvents of different polarity, the invention is characterized in that the lower hydroxy alkyl group is 2-hydroxy propyl.

The invention also relates to a method of preparing substantially spherical grains of substituted cellulose containing 2 – 25 g of substituted cellulose per deciliter and having a grain size generally between 2 and 2,000 $\mu$m.

Such a process is known from the aforementioned patent application. According to the known process, the cellulose is made soluble in colloidal form in an alkali solution by introducing into the cellulose, for example, xanthogenate groups by means of carbon disulphide in a known manner, whereafter the substituted cellulose is dissolved in alkali liquor to a concentration of 1 – 12 percent weight by volume and is atomized into droplet form, whereupon the obtained droplets are contacted with a cellulose regenerating agent, the droplets being enveloped by a liquid which is immiscible with the cellulose solution. It has been found possible in accordance with the present invention to simplify considerably the known process and, above all, to obtain a purer end product without the necessity of applying troublesome and technically complicated working-up operations if, for the purpose of rendering the cellulose soluble in colloidal form in alkali liquor, ether bound uncharged substituents are used instead of xanthogenate groups. In this respect, the substituents should be introduced into the cellulose to a substitution degree which corresponds to a solubility of the substitution product in an 8 percent solution of sodium hydroxide in water (w/w) of at least about 1 percent (w/w) and corresponding to an insolubility in water within the pH range of 11 – 1. Although the substituents render the cellulose soluble in a strongly alkaline solution, they do not deleteriously affect the utility of the cellulose product as, for example, a separation medium. Thus, in this instance the substituents may remain on the cellulose product when it is used as a separation medium.

The process of the present invention is mainly characterized by the steps of dissolving the substituted cellulose in an alkali liquor to a concentration of 1 – 15 percent (w/w), emulsifying the obtained solution to droplet form in a water immiscible liquid, contacting the obtained emulsion with an acid reactant, or a substance which can form an acid reactant in contact with the emulsion, so that the substituted cellulose is precipitated in the form of generally uniformly sized, substantially spherical grains.

Known methods may be applied to convert the cellulose to a form in which it becomes soluble in alkali in accordance with the foregoing. If the uncharged substituent is an alkyl group, the group can be introduced into the cellulose by treating the cellulose with a halide, preferably chlorides or bromides containing the desired group. If the substituted cellulose, for example, is ethyl cellulose, the ethyl group can be introduced into the cellulose to the desired degree of substitution, for example, by means of ethyl chloride. If the substituted cellulose is a cellulose substituted with hydroxy alkyl groups, however, the groups can be introduced into the cellulose by treating the cellulose with an epoxide compound. A very simple method of substituting cellulose for use in accordance with the invention is to treat the cellulose with a lower alkyl epoxide. Alternatively, a corresponding halogen hydrin can be used instead of the alkyl epoxide.

The grains produced in accordance with the invention preferably have a grain size of generally between 0.01 and 1 mm.

As an example of uncharged ether bound radicals in the substituted cellulose, particular mention can be made to methyl, ethyl, propyl, isopropyl, butyl, hydroxyethyl, 2-hydroxy propyl, 2,3-dihydroxy propyl, 2-hydroxy butyl, allyl etc.

The aforementioned stipulations with regard to the degree of substitution of the substituted cellulose normally implies that said magnitude lies between 0.04 and 0.60, preferably between 0.05 and 0.5. A suitable range is 0.08 – 0.4, while a suitable degree of substitution is roughly 0.2.

As –in the aforegoing, the substituted cellulose shall be dissolved in alkali liquor to a concentration of 1 – 15 percent. A preferred range is 3 — 10 percent. When these limits are exceeded or not reached, the properties which render the substituted cellulose in grain form according to the invention suitable as a separation medium in gel filtering processes no longer exist.

According to an important embodiment of the present invention, there is provided a substituted cellulose, wherein the molecules of the cellulose are cross-linked by bridges resulting from a bifunctional substance. Examples of bifunctional substances for the cross-linking reaction are epichlorohydrin, dichlorohydrin, diepoxybutan; bisepoxypropyl ether; ethylene glycol-bis-epoxypropyl ether and 1,4-butandiol-bis-epoxypropyl ether.

The cross-linking reaction readily takes place in the presence of water and an alkaline reacting substance as a catalyst.

A more complete understanding of the invention will be had from the following examples.

EXAMPLE 1

A. In a vessel provided with a strong agitator 240 g of cellulose (type "Avicell" from American Viscose Corp., U.S.A., having a degree of polymerization of 220) were slurried in 1,600 ml of toluene and 2.4 g of benzetone chloride. 100 g of sodium hydroxide and 2.4 g of sodium borohydride were then dissolved in 326 ml of water (mercerizing liquor). After 30 mins, 60 g of propylene oxide were added from a drop funnel and the temperature was raised rapidly to 50°C. The components were then permitted to react for 6 hours at 50°C.

Subsequent to decanting the toluene, the substituted cellulose was slurried in 50 percent ethanol and neutralized with concentrated HCl to pH = 7 – 8. After the product had settled, the overlying solution was decanted off and the product washed once in 50 percent ethanol and then copiously with water, whereafter the water content in the material was adjusted to obtain a total weight of 1800 g of product, whereupon 600 g of 36 % (w/w) sodium hydroxide were added to bring the substituted cellulose into solution.

B. 240 g of the above solution of substituted cellulose were diluted with 360 g of 10 % (w/w) sodium hydroxide solution, whereafter the cellulose solution was emulsified in 600 ml of ethylene dichloride and 14 g of cellulose acetate butyrate by means of an armature agitator having a speed of 200 rpm. After approx. 10 mins, the substituted cellulose was precipitated out in the form of macroporous pearls by adding to the emulsion 96 g of concentrated acetic acid in the form of a narrow jet.

The pearls were then initially washed four times with acetone and then once with water, whereafter they were slurried in water and the suspension acidified to a pH = 1 with hydrochloric acid. The product was finally washed repeatedly with water to a pH = 4 – 5.

The obtained product is substituted cellulose pearls having a size of substantially between 0.050 and 0.160 mm. The pearls contain 12 g of substituted cellulose per deciliter and had a content of hydroxy propyl groups ($C_3H_7O$) = 5.2 percent of the dry total weight. The product was insoluble in water within the pH-range of 11 – 1, but soluble in 8 percent solution of NaOH in water (w/w). The remaining properties of the product are shown in table 1 below.

The obtained substitution product of cellulose in grain form was found a very efficient separation agent in gel filtering processes using different types of solvent.

EXAMPLE 2

A. In the same manner as that described in example 1 A, there was first prepared a solution of substituted cellulose, although with the difference that the quantity of propylene oxide in this instance was 120 g.

B. 480 g of the above mentioned solution of substituted cellulose were diluted with 120 g of 10 % (w/w) sodium hydroxide solution, whereafter the cellulose solution was emulsified in 600 ml of ethylene dichloride and 18 g of cellulose acetate butyrate by means of an armature agitator having a speed of 200 rpm. The substituted cellulose was then precipitated in the same manner as in example 1 B. The precipitated product was worked-up in the manner described in example 1 B.

The obtained product was pearls of substituted cellulose having a size generally between 0.040 and 0.160 mm. The pearls were soluble in 8 percent solution of NaOH in water (w/w) and insoluble in water within the pH range 1 – 11. The pearls contained 13.4 g of cellulose per deciliter Remaining properties of the product are shown in the table below.

EXAMPLE 3

A. In the same manner as that described in example 1 A, there was first prepared a solution of substituted cellulose, although with the difference that in this instance the reaction temperature was 35°C.

B. 500 ml of the above mentioned solution of substituted cellulose were emulsified in 500 ml of ethylene dichloride and 14 g of cellulose acetate butyrate by means of an armature agitator having a speed of 200 rpm. After approx. 10 mins, the substituted cellulose was precipitated out in the form of macroporous pearls by adding to the system 120 g of concentrated acetic acid in the form of a narrow jet.

The pearls were then worked up in the manner described in example 1 A.

The obtained product comprised pearls of substituted cellulose which were insoluble in water within the pH range 1 – 11 but soluble in an 8 percent solution of NaOH in water (w/w). The pearls were approx. 0.056 – 0.315 mm in size and the content of cellulose in the pearls was 24.5 per deciliter. Remaining properties of the product are shown in the table below.

EXAMPLE 4

A. In the same manner as that described in example 1 A there was first prepared a solution of substituted cellulose, although in this instance the cellulose starting product had a degree of polymerization of 660 (type PS 14 from Hercules Powder, U.S.A.), and the amount of propylene oxide was 80 g.

B. Pearls of substituted cellulose were then produced from the aforementioned solution of substituted cellulose in the same manner as that described in example 1 B.

The pearls had a size of substantially 0.040 – 0.25 mm and were insoluble in water in the pH range of 11 – 1, but soluble in an 8 percent solution of NaOH in water (w/w). The pearls contained 9.7 g of cellulose per deciliter. Remaining properties of the product are shown in the table below.

EXAMPLE 5

A. In the same manner as that described in Example 1 A there was first prepared a solution of substituted cellulose, although with the difference that the propylene oxide was changed for 74 g of butylene oxide.

B. Pearls of substituted cellulose were produced from the aforementioned solution of cellulose in the same manner as that described with reference to example 2 B. The pearls had a size of substantially 0.025 – 0.16 mm and were insoluble in water in the pH range of 11 – 1, but soluble in an 8 percent solution of NaOH in water (w/w). The pearls contained 20.6 g of cellulose per deciliter. The remaining properties of the product are shown in the table below.

EXAMPLE 6

A. In a vessel provided with a strong agitator 240 g of cellulose (type "Avicell" from American Viscose Corp., U.S.A., but a polymerization degree of 220) were slurried in 3,800 ml of 2-propanol and 2.5 g of benzetone chloride. 72 g of sodium hydroxide and 2.4 g of sodium borhydride dissolved in 384 ml of water were then added. After 60 mins, 42.0 ml of ethylene oxide (in liquid form 0°C) mixed in 200 ml of 2-propanol were then added from a drop funnel. The temperature was raised rapidly to 55°C and the components were allowed to react for 6 hours at this temperature.

The substituted cellulose was then worked up in the same manner as that described with reference to example 1 A, and the solution of substituted cellulose was also prepared in the manner described in said example.

B. Pearls of substituted cellulose were prepared from the above mentioned solution of substituted cellulose in the same manner as that described in example 2 B.

The pearls had a size of substantially 0.025 – 0.16 mm and were insoluble in water within the pH range 11 – 1, but soluble in an 8 percent solution of NaOH in water (w/w). The pearls contained 17 g of cellulose per deciliter. Remaining properties of the product are apparent from the table below.

A number of tests were carried out in order to establish the valuable properties of the product.

1. Flow

The rigidity of the product was determined by subjecting it to a flow test. For this purpose, the product was slurried in water and packed to a bed having a diameter of 5 cm and a height of 10 cm. A stepwise increasing hydrostatic pressure drop (p) was applied over the bed, whereupon the linear flow (U) and the bed height (L) were measured for each value of $p$. The permeability of the bed was then calculated by the expression $K = L \cdot U/p$. When K is plotted on a logarithmic scale in a graph against the value of $p/L$, a straight line is obtained. The value $K_o$ is obtained where the line intersects the ordinate. If the gradient of the line is designated $\alpha$, the maximal flow ($U_{max}$) for the gel bed is obtained from the equation $$U_{max} = K_o/(\ln 10, \operatorname{tg}\alpha \cdot e)$$

2. Porosity

The porosity of the pearls was determined by chromatographing dextrans of known molecular weight through a bed of separation medium and calculating the extent to which the dextrans were able to utilize the volume of the separation medium. The eluent used was 0.1 M tris-HCl having a pH 8.0 and added with 0.9 percent (w/w) NaCl. $K_{AV}$ was used as a measurement of the penetrating ability of the test substances in the separation medium and this magnitude was defined as $$K_{AV} = (V_e - V_o)/(V_t - V_o)$$

in which
$V_e$ = elution volume
$V_o$ = the interstices between the grains
$V_t$ = bed volume $K_{AV} = 0$ indicates that the chromatographed substance is completely excluded from the pores of the separation medium, and $K_{AV} = 1$ indicates that the substance can utilize all of the separation medium.

The results of the tests are shown in the table below, in which the maximum flow for pearls having an average size of 100$\mu$m is given. The experimentally established flow can be readily calculated to an arbitrary mean size for products comprising substantially spherical grains, since it is known that the flow in such cases is directly proportional to the square of the mean grain size.

The measurement of the porosity of the pearls is given in the table as the molecular weight of the dextrans, which gives a $K_{AV}$ value of 0.50 and 0.20 resp. when the dextrans are chromatographed on the separation medium.

EXAMPLE 7

100 ml of 2.5 M NaOH were added to 500 ml of sedimented gel grains of substituted cellulose prepared according to Example 1 with gentle, but effective agitation. The temperature was rapidly increased to 50°C after which 10 g of epichlorohydrin were added to the suspension. The reaction was then permitted to proceed for 4 hours at 50°C. The mixture was then acidified to pH 3 – 4 with concentrated hydrochloric acid and then washed copiously with distilled water.

The obtained product was substituted, cross-linked cellulose in pearl form with sizes mainly in the range of from 0.040 to 0.160. The pearls contained 15 g of dry substance per deciliter. Remaining properties are evident from table 1 below.

TABLE

| Product according to example number | Substituent | Mol substituent per mol glucose | $M_Y$ for dextrans when $K_{AV}$ equals 0.5 | $M_Y$ for dextrans when $K_{AV}$ equals 0.2 | Flow 100h $U_{max}$ cm./h. |
|---|---|---|---|---|---|
| 1 | Hydroxypropyl | 0.15 | 4.6×10$^5$ | 5.5×10$^5$ | 90 |
| 2 | do | | 6.10$^3$ | 20.10$^3$ | 270 |
| 3 | do | 0.08 | 40.10$^3$ | 8.10$^5$ | 360 |
| 4 | do | | 10.10$^4$ | 4.10$^5$ | 170 |
| 5 | Hydroxybutyl | | 40.10$^4$ | 40.10$^5$ | 400 |
| 6 | Hydroxyethyl | | 5.10$^3$ | 45.10$^3$ | 400 |
| 7 | Hydroxypropyl | | 7.5×10$^4$ | 5.10$^5$ | 120 |

EXAMPLE 8

A. In a vessel provided with a strong agitator 120 g of cellulose (type "Avicell" from American Viscose Corp., U.S.A., having a degree of polymerization of 220) were slurried in 800 ml of toluene and 1.2 g of benzethonium chloride. Then 50 g of sodium hydroxide and 1.2 g of sodium boron hydride dissolved in 165 ml of water were added. After 30 minutes 80 g of diethyl sulphate were added and the reaction vessel placed into a water bath of 50°C. After two hours another 80 g of diethyl sulphate were added and finally after additional 2 hours still another 80 g of diethyl sulphate. After a reaction time of six hours in all the reaction was interrupted. After decanting of toluene the substituted cellulose was lurried in aqueous ethanol (50 percent) and neutralized with acetic acid to pH 4 – 5. Then the product was washed four times with ethanol on a nutch and four times with water. The water content of the product was then adjusted to give a total weight of 1,150 g, whereafter finally 138 g of sodium hydroxide dissolved in 212 ml of water were added in order to dissolve the substituted cellulose.

B. 500 g of the above mentioned solution of substituted cellulose were emulsified in 500 ml of ethylene dichloride and 16 g of cellulose acetate butyrate by means of an anchor agitator at 200 rpm. After about 10 minutes the substituted cellulose was precipitated in the form of macroporous pearls by adding 80 g of concentrated acetic acid in the form of a thin jet.

The pearls were then worked up in the same manner as the pearls of Example 1A.

The resulting product was substituted cellulose in the form of pearls insoluble in water within the pH-range of 1 – 11 but soluble in 8 percent solution of sodium hydroxide in water (w/w). The size of the pearls was mainly between 0.056 and 0.315 mm and the content of cellulose in the pearls was 2 – 25 g per deciliter.

The flow ($U_{max}^{100h}$) determined as above was 350 cm/h.

What we claim is:

1. Substituted cellulose in the form of substantially spherical grains containing 2 – 25 g of substituted cellulose per deciliter and having a pore size of substantially between 2 and 2000m$\mu$, wherein as the substituent the substituted cellulose contains ether bound uncharged groups having a substitution degree which corresponds to a solubility of the substitution product in an 8 percent solution of NaOH in water (w/w) of at least approx. 1 % (w/w) and corresponding to insolubility in water within the pH range of 11 – 1.

2. Substituted cellulose as claimed in claim 1, wherein the uncharged group is a lower alkyl group containing at most four carbon atoms.

3. A substituted cellulose as claimed in claim 1, wherein the uncharged group is a lower hydroxyl alkyl group containing at most four carbon atoms.

4. Substituted cellulose as claimed in claim 3, wherein the lower hydroxyl alkyl group is 2-hydroxypropyl.

5. Substituted cellulose as claimed in claim 1, wherein the molecules of cellulose are cross-linked with bridges resulting from a bifunctional substance.

6. A method of preparing substantially spherical grains of substituted cellulose containing 2 – 25 g of substituted cellulose per deciliter and having a grain size of substantially from 2 to 2,000m$\mu$, said cellulose containing as a substituent ether-bonded uncharged groups to a substitution degree corresponding to a solubility of the substitution product in 8 percent solution of NaOH in water (w/w) of at least approx. 1 % (w/w) and corresponding to an insolubility in water in the pH range of 11 – 1, which comprises dissolving the substituted cellulose in alkali liquor to a concentration of 1 – 15 % (w/w), emulsifying the obtained solution to droplet form in a water immiscible liquid, contacting the resulting emulsion with a member selected from the group consisting of acid reacting substances and substances capable of forming an acid reacting substance, so that the substituted cellulose is precipitated in the form of substantially spherical grains of substantially the same size as the droplets.

7. A method as claimed in claim 6, wherein the uncharged substituent of the cellulose is a lower alkyl group containing at most 4 carbon atoms.

8. A method as claimed in claim 6, wherein the uncharged substituent of the cellulose is a lower hydroxyl alkyl group containing at most four carbon atoms.

9. A method as claimed in claim 8, wherein the lower hydroxyalkyl group is 2-hydroxypropyl.

10. Separating medium for gel filtration comprising substituted cellulose in the form of substantially spherical grains containing 2 – 25 g of substituted cellulose per deciliter and having a pore size of substantially between 2 and 2,000m$\mu$, wherein as the substituent the substituted cellulose contains ether bound uncharged groups having a substitution degree which corresponds to a solubility of the substitution product in an 8 percent solution of NaOH in water (w/w) of at least approx. 1 percent (w/w) and corresponding to insolubility in water within the pH range of 11 – 1.

* * * * *